Feb. 7, 1928.

G. P. HENRY ET AL 1,658,639

AUTOMOBILE CONSTRUCTION

Filed Dec. 23, 1926

INVENTOR
Guy P. Henry
George Hunt
BY
P. W. Pomeroy
ATTORNEY

Patented Feb. 7, 1928.

1,658,639

UNITED STATES PATENT OFFICE.

GUY P. HENRY AND GEORGE HUNT, OF DETROIT, MICHIGAN, ASSIGNORS TO THE STUDEBAKER CORPORATION, OF SOUTH BEND, INDIANA, A CORPORATION OF NEW JERSEY.

AUTOMOBILE CONSTRUCTION.

Application filed December 23, 1926. Serial No. 156,573.

This invention relates to motor vehicles and particularly to means for preventing shimmying thereof, the principal object being the provision of a steering knuckle construction for accomplishing this result.

Another object is to provide a steering knuckle construction for a motor vehicle which will be operated upon by the "tramping" of the vehicle which invariably accompanies shimmying, to dampen the shimmying movement of those parts subject thereto.

Another object is to provide, in combination with a motor vehicle, a steering knuckle construction in which is incorporated a pair of friction surfaces normally held out of contact with each other, said friction surfaces being so controlled as to be brought into contact with each other upon tramping of said motor vehicle.

Another object is to provide in combination with a motor vehicle a steering knuckle construction in which a pair of co-operable friction surfaces are normally held out of contact with each other, means being provided for causing engagement of said friction surfaces upon tramping of said motor vehicle whereby rotation of said knuckle with respect to its axis is frictionally dampened.

Another object is to provide, in combination with a motor vehicle, a pivotal connection between a steering knuckle and the co-acting axle, including a pair of friction surfaces normally held out of contact with each other by spring means, said spring means being proportioned to hold said friction surfaces normally out of contact with each other and to allow said friction surfaces to contact with each other upon an excess load being thrown on the front axle due to tramping of said motor vehicle.

A further object is to provide in combination with the steering knuckle mechanism of a motor vehicle, a friction surface relatively stationary with respect to the axle thereof, a friction surface relatively stationary with respect to said knuckle normally held out of contact with the first-mentioned friction surface by spring means transmitting that proportion of the weight of the vehicle carried by the adjacent wheel from the axle to the steering knuckle, adjustable means being provided for controlling the action of said spring means whereby excess weight thrown on the front axle due to tramping action of said vehicle will cause contact of said friction surfaces with each other to dampen relative rotary movement of the knuckle with respect to the axle.

The above being among the objects of the present invention, the same consists of certain features of construction and combinations of parts to be hereinafter described with reference to the accompanying drawing and then claimed, having the above and other objects in view.

In the accompanying drawing which illustrates a suitable embodiment of the present invention, and in which like numerals refer to like parts throughout the different views, Figure 1 is a side view of a motor vehicle chassis in which a suitable embodiment of the present invention is incorporated.

Figure 1:
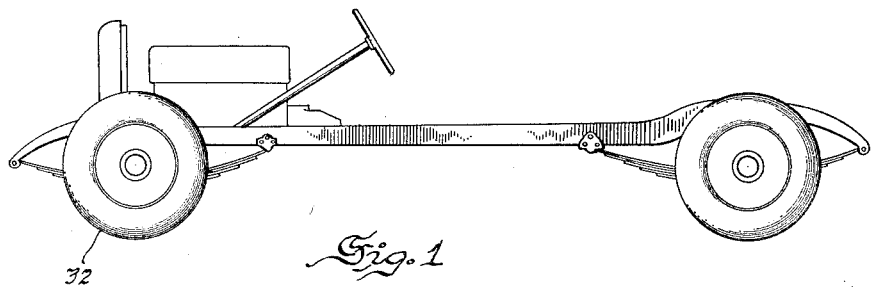
Figure 2:
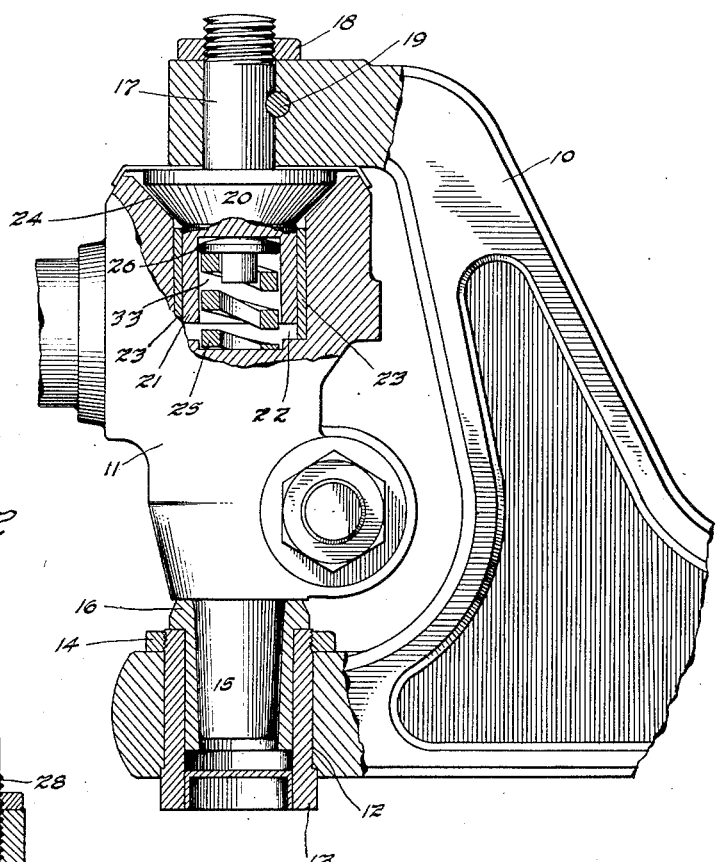
Figure 2 is a partially sectioned broken view of the steering knuckle and axle of the motor vehicle shown in Figure 1, in which is incorporated the means to prevent shimmying thereof.

The advantages of the use of balloon or low pressure tires in the automobile industry are offset, more or less, depending upon the construction of the particular vehicle to which they are adapted, by two principal disadvantages to which they give rise. These disadvantages are the phenomena commonly known as tramping and shimmying. Tramping is the bouncing up and down of the front end of the vehicle in a vertical plane as a result of a like movement of the front wheels. Shimmying is the violent movement of those parts carried by and movable with respect to the front axle longitudinally of the axle and around the king pins, which cause a corresponding transverse vibration of the front end of the vehicle. Shimmying usually causes the greater concern of the two inasmuch as the vibrations caused thereby are greater and the effect thereof is liable to be more disastrous to both the vehicle and the passengers thereof. Tramping, as a general rule, is less violent and is less apparent to the passengers of the vehicle than shimmying. We have found that tramping invariably precedes the phenomena of shimmying and that when the vehicle shimmies it invariably tramps also, and also that when a vehicle shimmies an oscillating movement is given to the steering knuckles about their king pins as an axis.

To overcome the difficulties above mentioned, we employ the tramping for bringing means into play for damping the oscillating movement of the steering knuckles and thereby prevent the same from shimmying. The manner in which this is done will be more apparent by referring to the accompanying drawing in which is shown the end of an axle 10 of conventional construction. The end of the axle 10 is forked, and between the forks thereof is pivotally mounted a steering knuckle 11. The lower fork of the axle 10 is provided with an opening 12 in which is slidably received a vertically adjustable sleeve 13 locked in place by a nut 14. The lower end of the knuckle 11 is provided with a downwardly projecting bearing portion 15 received within the bushing 16 carried by the sleeve 13 and vertically controlled in position thereby. The upper yoke of the axle 10 receives a pin 17 held from vertical movement by the lock nut 18 and against rotation with respect to the axle by the transverse pin 19, the pin 17 being in axial alignment with the lower bearing portion 15 of the steering knuckle 11. The pin 17 immediately below the lower surface of the upper fork of the axle 10 is provided with an enlarged downwardly converging cone-shaped surface 20 terminating in a downwardly projecting tubular extension 21. The upper surface of the knuckle 11 is formed to provide an opening 22 for receiving the tubular portion 21 and conical portion 20.

In the lower portion of the opening 22 is provided a bushing 23 for guiding the tubular portion 21, and the upper portion of the opening 22 is formed to provide a conical surface 24 complementary to the surface of the conical surface 20. Positioned within the opening 22 and projecting upwardly into the hollow interior 33 of the portion 21 of the pin 17 is a spiral spring 25 carrying a button member 26 in the upper end thereof, the spherical upper surface of the button member 26 bearing against the blind end of the opening 33 in the tubular portion 21. The spring 25 is proportioned to carry a load slightly in excess of the maximum normal load carried by the adjacent wheel 32 when confined within the space indicated in the drawing. The spring 25 therefore attempts to separate the conical surfaces 20 and 24 and this is actually allowed to a slight extent by adjusting the sleeve 13 thereby allowing the surface 24 to move away from surface 20. In the use of the construction above defined, under ordinary conditions all the weight of the vehicle carried by the adjacent wheel 32 is transmitted from the axle 10 to the knuckle 11 through the spring 25 which sustains such load by its own strength. It will be apparent that so long as the maximum normal load transmitted from the axle 10 to the knuckle 11 is not exceeded, the friction surfaces 20 and 24 will remain out of contact and the steering knuckle 11 will be freely rotatable in respect to the axle 10. When, however, an appreciable excess over the maximum normal load is transmitted from the axle 10 to the knuckle 11, the spring 25 will be compressed sufficiently to allow the surfaces 20 and 24 to come into contact with each other. Such an excess load will be thrown on the axle 10 when the automobile tramps, for in that case the front end of the automobile bounces up and down and the inertia of such movement in a downward direction will carry the surfaces 20 and 24 into contact. When tramping occurs then, the surfaces 20 and 24 are intermittently brought into frictional contact, and any rotary movement of the knuckle 11 in respect to the axle 10 will be frictionally resisted, and therefore the shimmying movement of the vehicle which causes or tends to cause relative rotary movement of the knuckle 11 in respect to the axle 10 will be dampened. The angularity of the conical surfaces 20 and 24 is such that although they will frictionally resist rotation of the knuckle 11 with respect to the axle 10 when in contact with each other to a substantial degree, they will not lock the knuckle from turning with respect to the axle 10 and thereby prevent steering of the vehicle when such surfaces are in contact.

Figure 3:
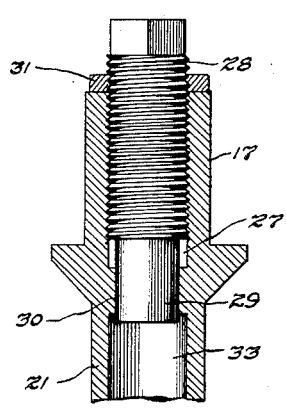
Figure 3 is a sectional view of a modified form of the upper friction members shown in Figure 2.

In Figure 3 a modified form of upper pivot pin construction is shown, in which a central opening 27 is provided in the pin member 17 and extends axially therethrough down to the hollow central opening 33 of the downwardly projecting portion 21. Threadably received in the opening 27 is a plug 28, the lower end 29 thereof being reduced in diameter and being slidably received within the reduced portion 30 of the opening 27 and being guided thereby, the reduced portion 29 projecting down into the hollow interior 33 of the downwardly projecting portion 21 to seat on the button 26. The plug 28 may be adjusted up or down to control the tension of the spring 25, thereby to adjust the same for the most efficient operation of the friction surfaces 20 and 24. A lock nut 31 is provided for locking the plug 28 in adjusted position.

Formal changes may be made in the specific embodiment of the invention described without departing from the spirit and substance of the broad invention, the scope of which is commensurate with the appended claims.

What we claim is:

1. In combination with a motor vehicle, an axle, a steering knuckle pivoted thereto, a friction surface carried by said axle, a friction surface carried by said knuckle normally out of contact with the first-mentioned friction surface, and means permitting the engagement of said friction surfaces upon tramping of said vehicle.

2. In combination, an axle, a steering knuckle pivotally secured thereto, a cone-shaped friction surface carried by said axle, a cup-shaped friction surface in co-operative relationship with said cone-shaped friction surface carried by said knuckle, and resilient means normally holding said friction surfaces out of contact with each other.

3. In combination with a motor vehicle, an axle, a steering knuckle pivotally secured thereto, a friction surface projecting from said axle, a friction surface in said knuckle in co-operative relationship with the first-mentioned friction surface, and means for holding said friction surfaces normally out of contact with each other and for allowing engagement of said friction surfaces upon tramping of said vehicle.

4. In combination with an axle of a motor vehicle, a steering knuckle pivotally secured thereto, a cone-shaped friction surface projecting from said axle, a co-operating cup-shaped friction surface in said knuckle, and spring means holding said friction surfaces in spaced relation up to the maximum normal load carried by said steering knuckle.

5. In combination with a motor vehicle, an axle provided with a forked end, a steering knuckle pivotally secured thereto, a friction surface projecting from one of the arms of said forked end, a friction surface formed in said knuckle normally out of contact with the first-mentioned friction surface, and permitting engagement of said friction surfaces upon tramping of said vehicle.

6. In combination with the axle and steering knuckle of a motor vehicle, a pair of co-operating conical friction surfaces carried by said axle and steering knuckle, and means of holding said cooperating conical friction surfaces out of contact with each other under normal vertical movement of said vehicle and for allowing engagement of said friction surfaces upon abnormal vertical movement of said vehicle.

7. In combination with a motor vehicle, an axle provided with a forked end, a pin projecting downwardly from the upper arm of said fork, said pin provided with a downwardly converging conical surface, a steering knuckle pivotally mounted in said yoke provided with a conical depression matching said conical surface, and means for normally holding said conical surface out of contact with said conical depression and for allowing engagement of said conical surface with the walls of said depression upon tramping of said vehicle.

8. In combination with the axle of a motor vehicle provided with a yoked end, a pivot member carried by the upper arm of said yoke provided with a downwardly converging conical surface terminating in a downwardly projecting bearing portion, a steering knuckle pivotally mounted in the lower arm of said yoke and provided with an opening in the upper end thereof receiving said conical portion of said pivot member and said downwardly projecting bearing portion thereof in matching relation therewith, and spring means in said opening normally holding said conical surface out of contact with said conical depression.

9. In combination with a motor vehicle, an axle, a steering knuckle pivotally secured thereto, a friction surface carried by said axle, a friction surface carried by said knuckle, resilient means normally holding said friction surfaces out of contact with each other, and means for adjusting said resilient means.

10. In combination with an axle of a motor vehicle, a steering knuckle pivotally secured thereto, a friction surface carried by said axle, a co-operating friction surface carried by said knuckle, spring means tending to hold said friction surfaces in spaced relation, and adjustable means for controlling said spring means.

11. In combination with a motor vehicle, an axle, a steering knuckle pivotally secured thereto, co-operating friction surfaces carried by said axle and said steering knuckle, spring means normally holding said friction surfaces in spaced relation, said spring means normally transmitting all the weight from said front axle to said knuckle, and adjustable means for controlling the maximum load carried by said spring.

Signed by us at Detroit, Michigan, this 16th day of December, 1926.

GUY P. HENRY.
GEORGE HUNT.